United States Patent [19]
Ookubo et al.

[11] B 3,924,717
[45] Dec. 9, 1975

[54] FLUID ACTUATED CLUTCH

[75] Inventors: Takashi Ookubo, Yokohama; Hideo Hamada, Yokosuka, both of Japan

[73] Assignee: Nissan Motor Company Limited, Yokohama, Japan

[22] Filed: July 25, 1973

[21] Appl. No.: 382,290

[44] Published under the Trial Voluntary Protest Program on January 28, 1975 as document no. B 382,290.

[30] Foreign Application Priority Data
July 26, 1972 Japan.............................. 47-74781

[52] U.S. Cl................................ 192/86; 192/113 B
[51] Int. Cl.²........................................ F16D 25/063
[58] Field of Search........................... 192/86, 113 B

[56] References Cited
UNITED STATES PATENTS

| | | |
|---|---|---|
| 2,178,017 | 10/1939 | Fedden et al......................... 192/86 |
| 3,213,988 | 10/1965 | Maurice et al.............. 192/113 B X |
| 3,437,183 | 4/1969 | Maurice...................... 192/113 B X |

*Primary Examiner*—Benjamin W. Wyche

[57] ABSTRACT

A fluid actuated clutch comprises a fluid pressure responsive plate defining with a rotatable clutch drum first and second chambers which are adapted to receive fluid under pressure selectively, and a hub and driven disc assembly in the second chamber, so that first and second sub-chambers are formed on axially opposite sides of the hub and disc assembly. The fluid pressure responsive plate has formed therethrough at least one passageway for permitting fluid communication between the first and second sub-chamber and one-way valve is provided in the hub to permit fluid flow from the second to first sub-chambers. The driven disc is prevented from engaging with drive discs by fluid flow therebetween from the first to second sub-chambers when the clutch is in neutral condition.

6 Claims, 5 Drawing Figures

FLUID ACTUATED CLUTCH

The present invention relates to a clutch, and more particularly to an improved fluid actuated clutch of a type particularly suitable for use in an automatic transmission of a vehicle.

Automatic transmissions commonly employ a clutch which is disengaged for neutral or non-drive operation, and which is engaged to connect a transmission gearbox to a vehicle engine, there being a torque converter between the engine and the clutch. From a neutral or non-drive condition of transmission operation, an old type prior art clutch engages with objectionable creeping. To avoid this objectionable creeping, a conventional fluid actuated clutch has recently been designed (see FIG. 1), which includes a spring-loaded driven friction disc splined to a driven clutch hub which is in turn splined to a power output shaft such as a gear-box input shaft. In this arrangement, the driven friction disc is biased to a neutral position to disengage from a drive friction disc which is fixed to a clutch drum splined to a power input shaft such as a turbine shaft of a torque converter. Upon engagement, the spring biasing the driven driction disc is compressed by means of a fluid actuated pressure plate. However, the resiliency of the spring gradually deferiorates to an unacceptable level mostly due to fatigue of the spring.

In this configuration of a conventional clutch, the spring is arranged so that it contacts with or abuts against the driven friction disc. Hence, the contacting surface of the driven friction disc is liable to wear at a relatively high rate, and a considerable number of parts is necessary to hold the spring in place adjacent to the driven friction disc, reducing the life of the driven friction disc and increasing the cost thereof. Moreover, a rather complicated configuration is provided, thereby increasing the probability of failure. Thus, this configuration of a conventional fluid actuated clutch must be considered unacceptable from the standpoints of reliability and durability.

It is accordingly an object of the present invention to solve the above mentioned problem and provide a fluid actuated clutch assembly which does not include a mechanical spring.

Another object of the present invention is to provide a fluid actuated clutch assembly which is simple in construction, which is excellent in durability and which is reliable in operation.

These and other objects, features and advantages of the present invention will be apparent from the following description and the accompanying drawings, in which.

Before entering into a description of a clutch assembly embodying the present invention, the conventional prior art clutch assembly illustrated in FIG. 1 will be described to make clear the technical problem previously mentioned.

Figure 1:
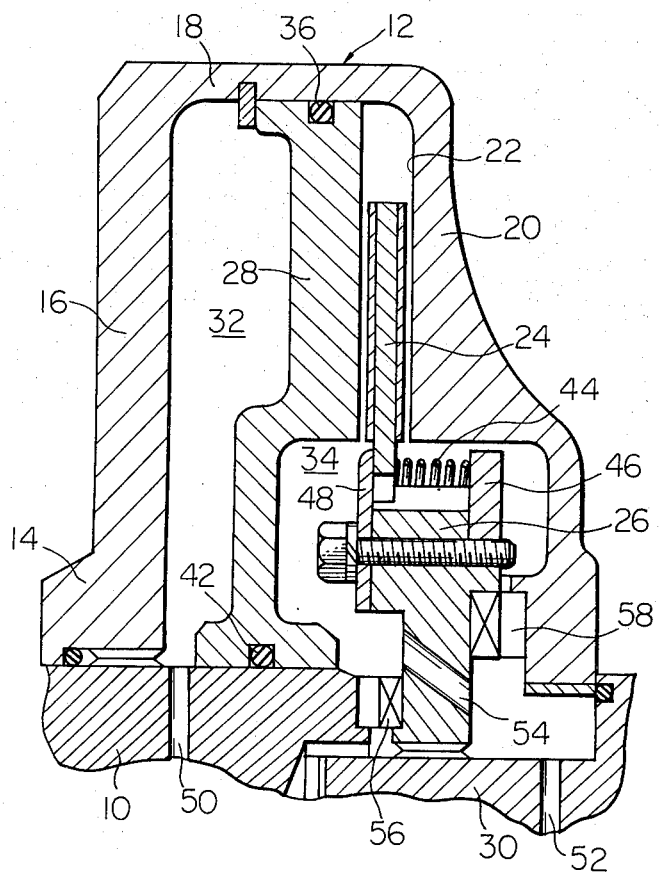
FIG. 1 is a fragmentary longitudinal sectional view of a typical conventional clutch assembly utilizing a spring loaded driven friction disc.

Referring to FIG. 1, a power input shaft 10 or an engine driven hydrodynamic torque transmitting mechanism such as a fluid coupling or torque converter drives a clutch drum indicated generally as 12. The drum 12 includes a hub 14 supported upon and driven by the shaft 10, a generally disc shaped flange portion 16, an axially extending drum portion 18, a cover portion 20 and a drive friction disc 22 attached to the inner wall of the cover portion 20.

A driven friction disc 24 disposed within the drum 12 and splined to a driven clutch hub 26 is arranged between a stepped pressure plate 28 and the cover portion 20. The driven clutch hub 26 maay drive a gearbox input shaft 30.

The pressure plate 28 disposed within the drum 12 is shaped to define with the drum 12 and input shaft 10 a first chamber 32 to receive fluid under pressure to engage the clutch assembly, and to define with the drum 12 and gearbox input shaft 30 a second chamber 34 to receive fluid under pressure to disengage the clutch assembly. The periphery of the pressure plate 28 carries a seal 36 to prevent fluid communication between the chambers 32 and 34 therethrough. A radially inner portion 40 of the pressure plate 28 carries a seal 42 to prevent fluid communication between the chambers 32 and 34 therethrough, and is recessed as shown to provide an enlarged configuration of the chamber 34. A clutch release spring 44 sealed on a spring seat 46 biases the disc 24 to disengage from the disc 22, and the leftward limit of travel of the disc 24 is determined by a stopper 48.

The power input shaft 10 and gearbox input shaft 30 are drilled radially to provide fluid passageways 50 and 52 communicating with the first and second chambers 32 and 34 respectively. The passageways 50 and 52 may be selectively connected to a source of fluid under pressure or a non-pressurized fluid reservoir by suitable valve means, although not shown. The driven clutch hub 26 is drilled to provide a fluid passageway 54 which allows communication between the passageway 52 and the chamber 34. Bearings 56 and 58 provide co-axial rotation between the driving assembly comprising the shaft 10, drum 12 and pressure plate 28, and the driven assembly comprising the disc 24, hub 26 and shaft 30.

To engage the clutch assembly, fluid under pressure is supplied through the passageway 50 into the chamber 32 which urges the pressure plate 28 against the force of the spring 44 to provide tight contact between the pressure plate 28 and discs 22 and 24. The chamber 34 is connected to the reservoir through the passageways 54 and 52. If the fluid supply connections are reversed, fluid under pressure in the chamber 34 urges the pressure plate 28 away from the disc 24, and the spring 44 urges the disc 24 away from the disc 22 to disengage the clutch assembly.

Figure 2:
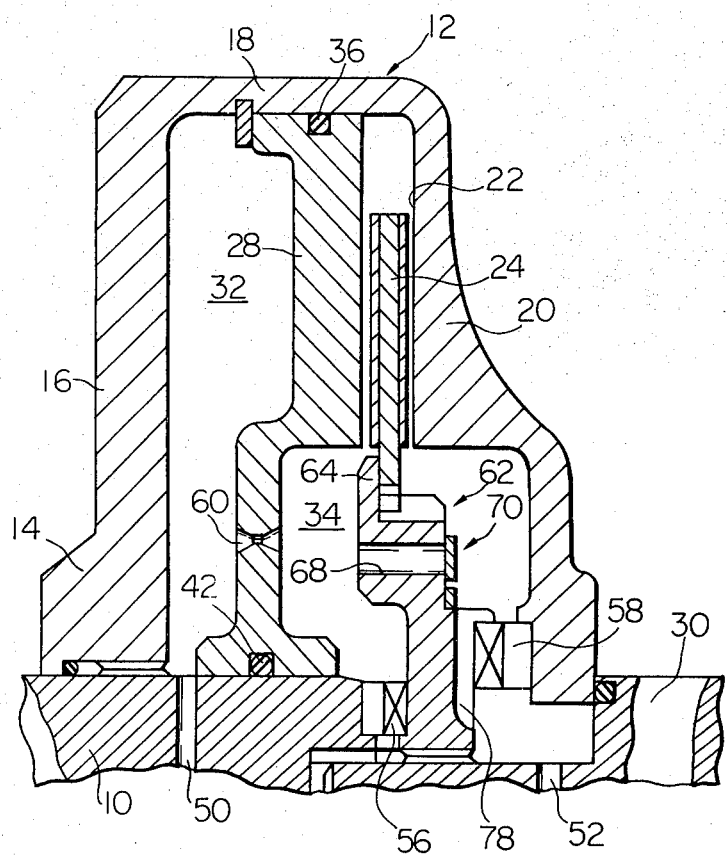
FIG. 2 is a fragmentary longitudinal sectional view of a clutch assembly embodying the present invention.
Figure 3:
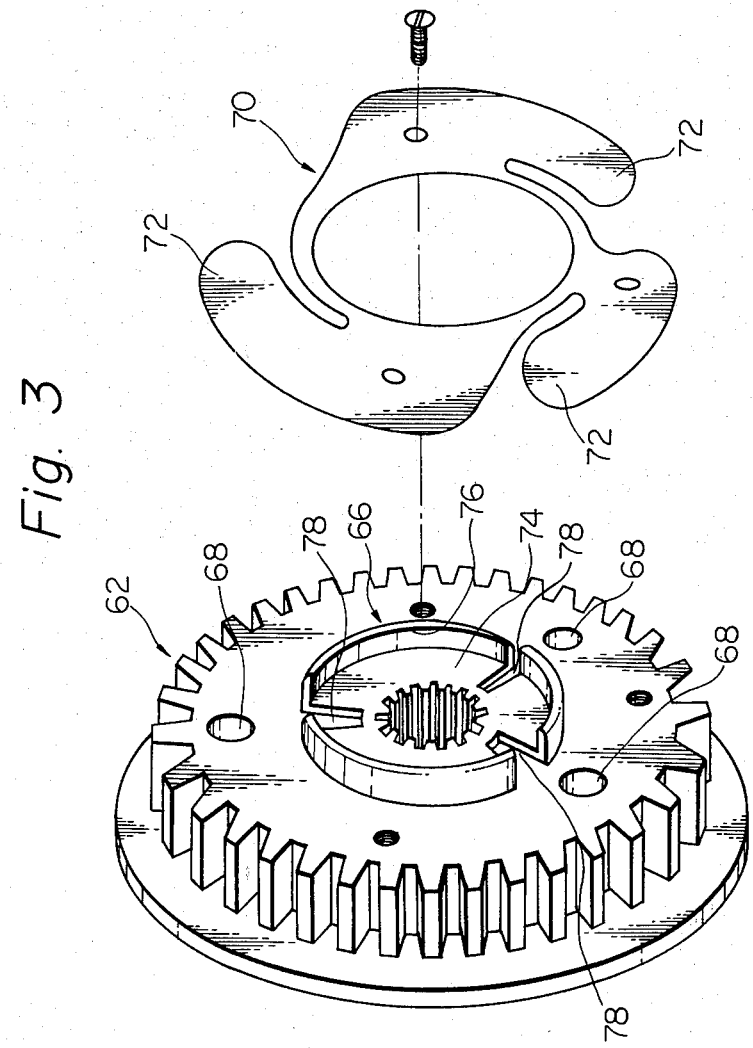
FIG. 3 is an exploded view of important parts of the clutch assembly of FIG. 2.
Figure 4:
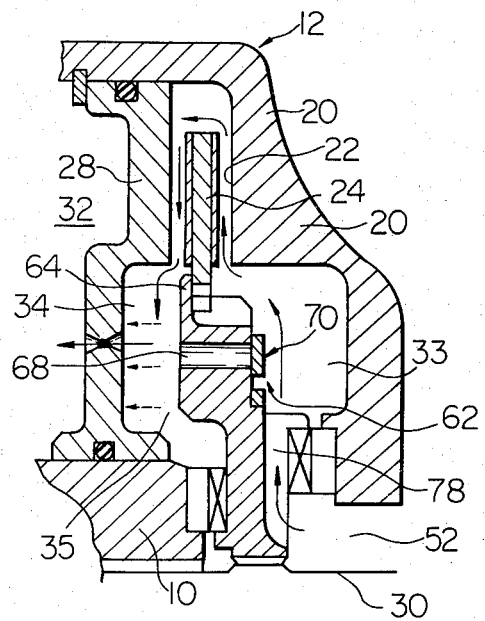
FIG. 4 is a fragmentary longitudinal sectional view of the clutch assembly of FIG. 2 illustrating its disengaged position.

Referring to FIGS. 2, 3 and 4, there is shown a clutch assembly embodying the present invention. It will be seen that this embodiment of the present invention is similiar to the clutch assembly of FIG. 1. Thus, the same reference numerals as used in FIG. 1 will be utilized to indicate corresponding parts in FIGS. 2 to 5.

Referring now to FIGS. 2 and 3, a plurality of passageways 60 are provided through the pressure plate 28 to provide fluid communication between the chambers 32 and 34. A driven clutch hub 62 is splined to the gearbox input shaft 30 and to the friction disc 24. The driven clutch hub 62 includes a stopper 64 against which the driven friction disc 24 abuts when the driven friction disc 24 is in its illustrated or disengaged position, and a segmented collar indicated generally as 66 provided on one axial surface thereof. The driven clutch hub 62 is drilled axially to provide three fluid passageways or holes 68 as best seen in FIG. 3.

Attached to the same axial surface of the driven clutch hub 62 as the collar 66 operatively engaging with the holes 68 (see FIG. 2) is a one-way valve indicated generally as 70.

The one-way valve 70 is a sheet of suitable material having the general shape of triskelion as best seen in FIg. 3. The valve 70 fits over the collar 66 and is bolted to the clutch hub 62 with respective legs 72 operatively engaging with the holes 68. Preferably, the legs 72 of the valve 70 may be bent slightly axially in order to block off the holes 68 when attached to the clutch hub 62 by bolts.

The bearing 58 abuts on segmented disc portions 74 and segmented ring portions 76 axially extending from the periphery of the respective segmented disc portions 74.

The operation of the clutch assembly of FIG. 2 will now be described.

in FIG. 4, the clutch assembly is shown as disengaged. Fluid under pressure is supplied through the passageways 52 and 78 into a first sub-chamber 33 of the chamber 34 defined by the cover portion 20, hub 62 and shaft 30. The chamber 32 is connected to the reservoir through the passageway 50. Fluid pressure in the first sub-chamber 33 acts to displace the disc 24 away from the disc 22. This forms a clearance between the discs 22 and 24 through which fluid can flow to act on the pressure plate 28 through a clearance provided between the periphery of the pressure plate 28 and the inner peripheral surface of the clutch drum 12. This fluid is then able to act on the pressure plate 28 to displace it away from the disc 24. Consequently, a flow of fluid is established and maintained between the first sub-chamber and a second sub-chamber 35 defined by the pressure plate 28, hub 26, and input shaft 10. Fluid entering the second sub-chamber 35 is allowed to pass therethrough into the chamber 32 through the passageways 60, and consequently to return to the reservoir through the passageway 50. During this condition of operation of the clutch assembly, the disc 24 is held abutted against the stopper 64 by hydrodynamic pressure generated by the flow of fluid from the first to the second sub-chambers 33 and 35 respectively around the disc 24, and a mechanical spring is rendered unnecessary. It will be noticed that the valve 70 is held against the surface of the hub 62 to effectively block off the holes 68 by the pressure difference between the first and second sub-chambers 33 and 35 respectively.

Figure 5:
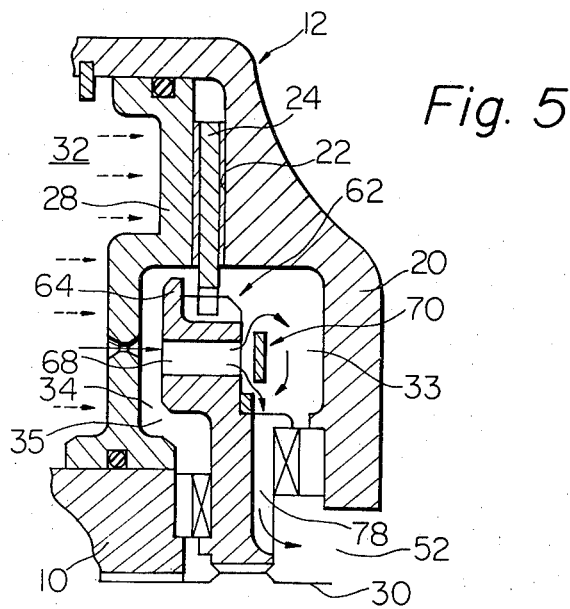
FIG. 5 is a fragmentary longidudinal sectional view of the clutch assembly of FIG. 2 illustrating its engaged position.

In FIG. 5, which shows the clutch assembly as engaged, the fluid supply connections are reversed, and fluid under pressure is supplied into the chamber 32 through the passageway 50 to urge the pressure plate 28 toward the disc 24. The first sub-chamber 33 is connected to the reservoir through the passageways 78 and 52. Fluid from the chamber 32 flows into the second sub-chamber 35 through the passageways 60. In this case, however, it is not desirable to allow fluid flow around the periphery of the disc 24 because this would generate hydrodynamic pressure which would hamper engagement of the pressure plate 28 and discs 22 and 24. Thus, the valve 70 is opened due to the pressure difference between the second and first sub-chambers 35 and 33 respectively,, and fluid flow is established through the holes 68. The holes 68 are made large enough such that if the valve 70 is opened, fluid flow is effectively prevented around the periphery of the disc 24. Broken arrows in FIGS. 4 and 5 show the pressures acting to disengage and engage the clutch assembly respectively, and solid arrows indicate the direction of fluid flow through the relevent passageways.

From the foregoing description it is now apparent that hydrodynamic pressure replaces a mechanical biasing means such as the clutch release spring 44 for biasing the driven friction disc toward a disengaged position. It is also seen that deterioration of fluid adjacent to the drive and driven friction discs will be considerably reduced due to the fact that the fluid (lubricanting oil) constantly circulates therebetween. Thus it will be appreciated that the drive and driven friction discs are free from wear caused by deterioration of lubricanting oil.

It will also be appreciated that a clutch assembly of the present invention is smiple in construction and thus the probability of failure is considerably reduced.

Since, in a clutch assembly of the present invention, a flow of pressurized fluid is established in the vicinity of the segmented collar 66, frictional forces imposed on the clutch hub 62 are reduced to a minimum, and the clutch hub 62 is able to sustain an axial thrust load with extremely low wear.

For the foregoing reasons, it is now explicitly clear that a clutch according to the present invention is excellent in durability and also the reliability.

What is claimed is:

1. A clutch assembly comprising:
   a rotatable clutch drum;
   a fluid pressure responsive pressure plate defining with said clutch drum first and second chambers which are adapted to receive fluid under pressure selectively;
   a drive friction disc fixed to said clutch drum and exposed to said second chamber;
   a clutch hub rotatable within said second chamber;
   a driven friction disc splined to said clutch hub, said driven friction disc being movable toward said drive friction disc to engage with said drive friction disc in response to pressure in said first chamber, and away from said drive friction disc to disengage from said drive friction disc in response to pressure in said second chamber, said clutch hub and said driven friction disc dividing said second chamber into a first sub-chamber adjacent to said drive friction disc and a second sub-chamber adjacent to said pressure plate, said first and second sub-chambers being on axially opposite sides of the hub and disc assembly;
   said pressure plate having formed therethrough at least one passageway for permitting fluid communication between said first chamber and said second subchamber;
   said clutch hub having formed therethrough at least one hole for permitting fluid communication between said first and second sub-chambers;
   a valve for permitting fluid to flow from said second to said first sub-chamber through said at least one hole, but preventing fluid from flowing from said first to said second sub-chamber through said at least one hole.

2. A clutch assembly as claimed in claim 1, wherein said clutch hub includes a segmented collar consisting of segmented disc sections and segmented ring portions extending from said segmented disc sections.

3. A clutch assembly as claimed in claim 2, wherein said driven friction disc is maintained by pressure of fluid adjacent thereto between said drive friction disc and said pressure plate member when said drive and driven frictions discs are disengaged.

4. A clutch assembly as claimed in claim 3, wherein said clutch hub includes a stopper against which said driven friction disc is abuttable to limit movement thereof toward said pressure plate.

5. A clutch assembly as claimed in claim 4, wherein said at least one hole is in the form of three holes drilled through said clutch hub.

6. A clutch assembly as claimed in claim 5, wherein said valve is a sheet having the shape of triskelion attached to said clutch hub with its legs blocking off said holes.

* * * * *